US 7,957,578 B2

(12) United States Patent
Chang et al.

(10) Patent No.: US 7,957,578 B2
(45) Date of Patent: Jun. 7, 2011

(54) METHOD FOR AUTOMATICALLY INSPECTING POLAR DIRECTIONS OF POLAR ELEMENT

(75) Inventors: Chung-Hwa Chang, Taipei (TW); Hsin-Ching Su, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 1018 days.

(21) Appl. No.: 11/767,483

(22) Filed: Jun. 23, 2007

(65) Prior Publication Data

US 2008/0025595 A1 Jan. 31, 2008

(30) Foreign Application Priority Data

Jul. 27, 2006 (TW) ............................... 95127439 A

(51) Int. Cl.
G06K 9/00 (2006.01)
(52) U.S. Cl. ...................... 382/145; 382/217; 356/237.1
(58) Field of Classification Search .................. 382/145, 382/147, 217; 700/121; 356/237.1, 237.5
See application file for complete search history.

(56) References Cited

U.S. PATENT DOCUMENTS

| | | | |
|---|---|---|---|
| 6,597,381 B1 * | 7/2003 | Eskridge et al. | 715/804 |
| 6,768,543 B1 * | 7/2004 | Aiyer | 356/237.4 |
| 2004/0145734 A1 * | 7/2004 | Shibata et al. | 356/237.5 |
| 2005/0286754 A1 * | 12/2005 | Thomas et al. | 382/149 |
| 2006/0232769 A1 * | 10/2006 | Sugihara et al. | 356/237.2 |
| 2007/0013772 A1 * | 1/2007 | Tham et al. | 348/87 |

FOREIGN PATENT DOCUMENTS

| | | |
|---|---|---|
| CN | 2406256 Y | 11/2000 |
| TW | 381182 | 2/2000 |

* cited by examiner

*Primary Examiner* — Gregory M Desire
(74) *Attorney, Agent, or Firm* — Jianq Chyun IP Office

(57) ABSTRACT

A method for automatically inspecting positive and negative polar directions of a polar element on a substrate is provided. Firstly, an image of a standard substrate is retrieved to form a standard sample, and relevant data of the polar elements on a substrate to be inspected is obtained to form the inspected sample. Then, transforming the geometry coordinates to the pixel coordinates, using different shapes of frames to make each polar element be positioned within, and marking the positions, positive and negative polar directions of all the polar elements in the image of the standard substrate. A database is set up to record the relevant data of each polar element as the standard sample for inspecting. The standard sample is compared with all the samples to be inspected to inspect whether the polar directions of each polar element is correct or not.

9 Claims, 4 Drawing Sheets

METHOD FOR AUTOMATICALLY INSPECTING POLAR DIRECTIONS OF POLAR ELEMENT

CROSS-REFERENCE TO RELATED APPLICATION

This application claims the priority benefit of Taiwan application serial no. 95127439, filed Jul. 27, 2006. All disclosure of the Taiwan application is incorporated herein by reference.

BACKGROUND OF THE INVENTION

1. Field of Invention

The present invention relates to a method for inspecting a polar element, and more particularly, to a method for automatically inspecting polar directions of a polar element on a substrate.

2. Description of Related Art

Generally speaking, many electronic elements are assembled on the printed circuit board by automatic assembly equipment.

However, some electronic elements have a voltage polarity requirement. The correct polarity is indicated on the packaging by a stripe with minus signs and possibly arrowheads for the manual visual inspection. This is necessary because a reverse-bias voltage will destroy polar elements. Taking electrolytic capacitors for example, if one electrolytic capacitor with the reversed polar directions is assembled on the motherboard, the electrolytic capacitor may be destroyed in the electrical character test of the In-Circuit Tester (ICT).

As for the manual visual inspection of the positive and negative polar directions of the electrolytic capacitor, particularly, the tester needs to prefabricate a mask plate with a plurality of through-holes, so as to serve as a standard sample for inspecting The position and size of the plurality of through-holes of the mask plate are determined by the position and size of the electrolytic capacitor on the standard printed circuit board. The positive and negative polar directions of the electrolytic capacitor are marked beside each through-hole on the mask plate. When the tester intends to inspect the polarities of the electrolytic capacitor on a motherboard to be inspected, he/she needs to align the motherboard with the mask plate and then cover the mask plate on the motherboard, such that the electrolytic capacitor is protruded from the mask plate, which is convenient for human eyes to inspect whether the positive and negative polar directions of each electrolytic capacitor are correct or not.

However, since the elements required to be inspected by the tester are not only limited to the electrolytic capacitor, various elements with different sizes on the motherboard are required to be inspected whether their individual inserting positions or the positive and negative polar directions are correct or not. Working for a long time easily makes people feel tired, and it is easy for the tester not to inspect the electrolytic capacitor with reversed polar directions due to carelessness. Therefore, when the tester performs the electrical character test to the motherboard having an electrolytic capacitor with reversed polar directions, the motherboard may be exploded and thereby damaging or burning out a part of the elements thereon, and the yield of the product cannot be maintained.

Moreover, the cost for repairing the exploded motherboard is nearly equal to that for re-fabricating a new motherboard, so the cost for fabricating the product cannot be effectively reduced. Besides, if the motherboard having the electrolytic capacitor with reversed polar directions has been sent to the client, and it is exploded or burnt out when being used by the customer, the customer will not trust the product any longer.

SUMMARY OF THE INVENTION

An objective of the present invention is to provide a method for automatically inspecting polar directions of a polar element. By using computer to replace the manual visual inspection, the circumstance of incorrect polar directions of the polar element and the cost can be reduced, and the yield of the product can be maintained.

In order to achieve the above or other objectives, the present invention provides a method for automatically inspecting polar directions of the polar element, which is used for inspecting a substrate to be inspected having a plurality of polar elements to be inspected. The method comprises the following steps. Firstly, a standard sample is obtained, which is recording position coordinates and polar directions of the plurality of polar elements. Then, an inspected image of a substrate to be inspected is retrieved, and an inspected sample recording position coordinates and polar directions of each polar element to be inspected is provided. Finally, the standard sample is compared with the inspected sample.

In an embodiment of the present invention, the method further comprises a step of obtaining the standard sample by a data or by retrieving a standard image of the standard substrate, and the data is used to record position coordinates and polar directions of a plurality of polar elements disposed on the standard substrate.

In an embodiment of the present invention, the method further comprises a step of transforming geometry coordinates of each polar element to pixel coordinates.

In an embodiment of the present invention, the method further comprises a step of calibrating the substrate to be inspected.

In an embodiment of the present invention, the method further comprises a step of binary-converting colors of the polar elements in the standard image to obtain polar directions.

According to the above embodiments, the method of binary-converting the colors of the inspected image comprises the following steps. Firstly, the computer is used to select a pixel range of the polar elements in the inspected image. Next, a threshold is set, and the computer determines whether grayscale values of a plurality of pixel elements within the pixel range are larger than the threshold or not. Then, the color of the pixel element with the grayscale value being larger than the threshold is output as white, and the color of the pixel element with the grayscale value being smaller than the threshold is output as black.

In an embodiment of the present invention, the method for automatically inspecting polar directions of the polar element further comprises a step of marking the polar element to be inspected in the inspected image, if the polar directions of the inspected sample are not inconsistent with that of the standard sample.

In an embodiment of the present invention, the method for automatically inspecting polar directions of the polar element further comprises a step of displaying the pixel coordinates of the polar element to be inspected, if the polar directions of the inspected sample are not inconsistent with that of the standard sample.

The present invention uses computers instead of the conventional manual visual inspection to automatically inspect the polar directions of the polar element disposed on the substrate. In this manner, not only the labor cost is reduced, but the error of the polar directions of the polar element disposed on the substrate is also reduced, so as the yield of the product is enhanced. Moreover, the explosion or the burning out of the substrate caused by the error of the polar directions of the polar element disposed on the substrate is avoided during the electrical test, and the cost for repairing or re-fabricating the substrate is reduced.

In order to make the aforementioned and other objects, features and advantages of the present invention comprehensible, preferred embodiments accompanied with figures are described in detail below.

DESCRIPTION OF EMBODIMENTS

Figure 1:
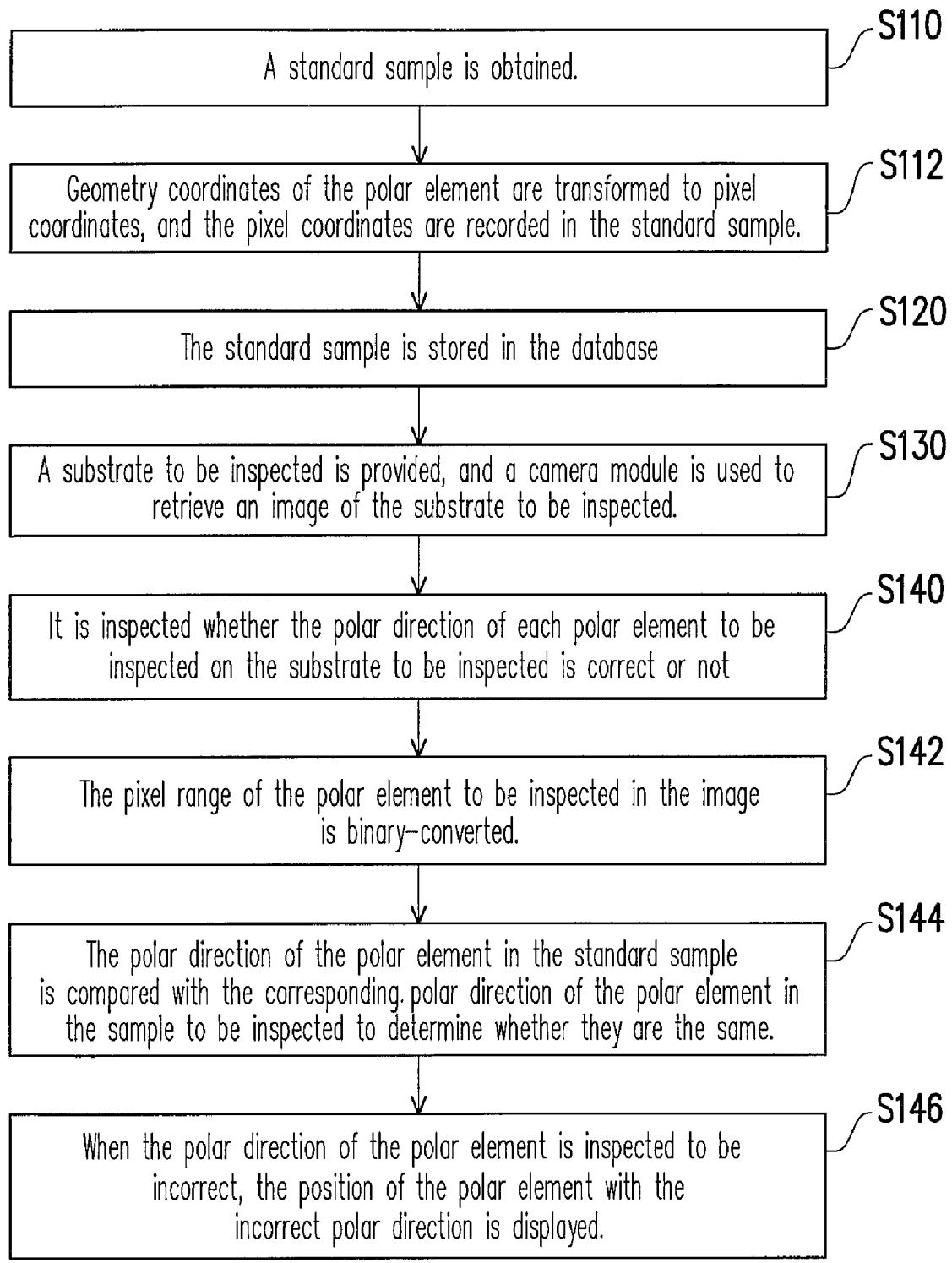
FIG. 1 is a flow chart of a method for inspecting polar directions of a polar element according to the present invention.
Figure 2:
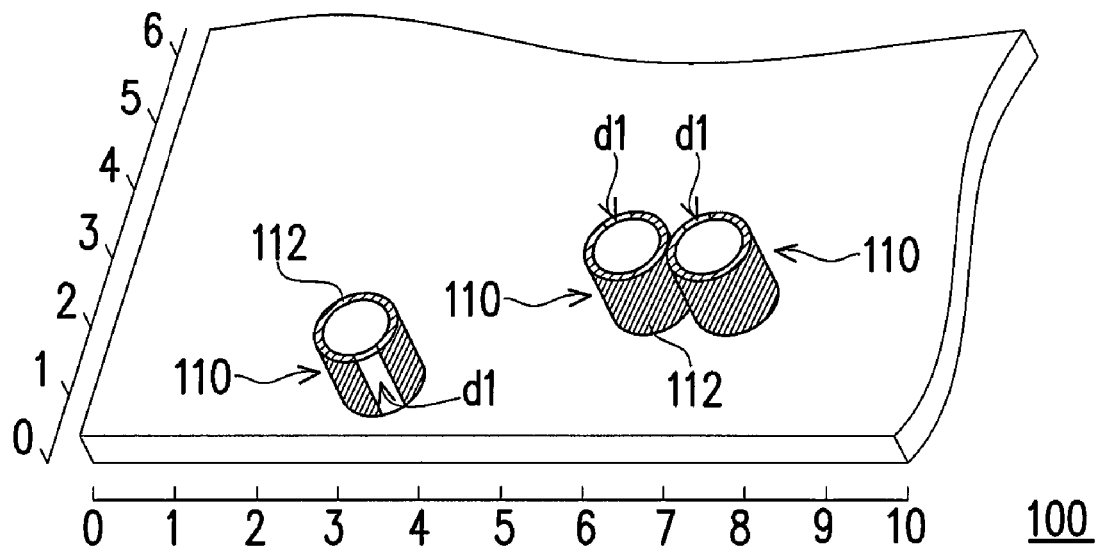
FIG. 2 is a partial schematic view of a standard substrate according to the present embodiment.
Figure 3:
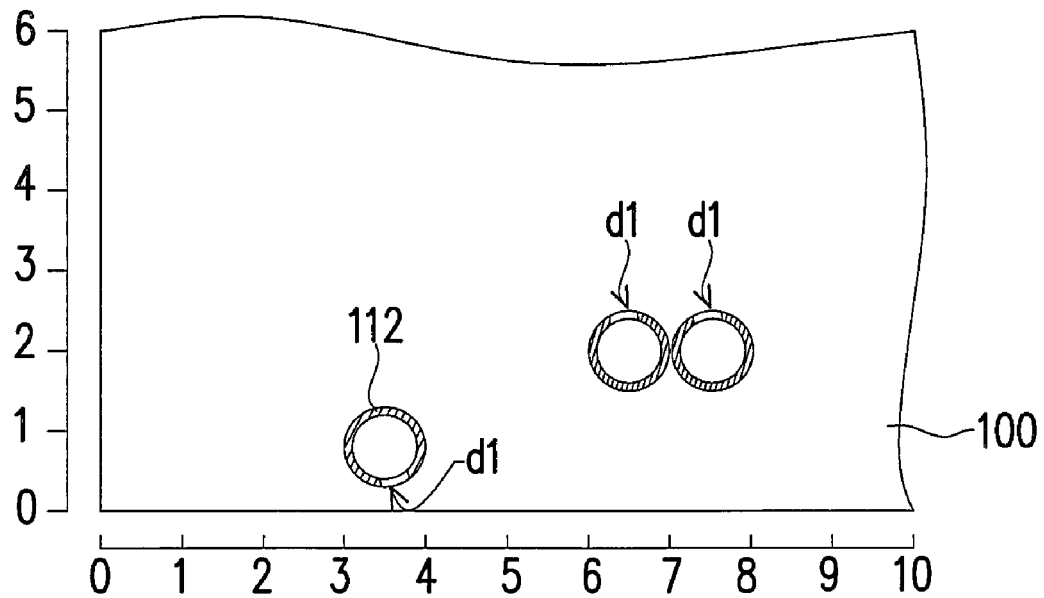
FIG. 3 is a schematic view of an image of the standard substrate of FIG. 2.

FIG. 1 is a flow chart of a method for inspecting polar directions of a polar element according to the present invention, FIG. 2 is a partial schematic view of a standard substrate according to the present embodiment, and FIG. 3 is a schematic view of an image of the standard substrate of FIG. 2. Referring to FIG. 1, FIG. 2 and FIG. 3, first, in Step S110, a standard sample is obtained, and the method for obtaining the standard sample includes that an image I1 of a standard substrate 100 is retrieved, and then, position coordinates and polar directions of a plurality of polar elements disposed on the standard substrate is recorded as a standard sample. In the present embodiment, the standard substrate 100 is a motherboard, and a plurality of electronic elements or other polar elements 110 that are required to be inserted by hand are disposed on the standard substrate 100, wherein the polar elements 110 are, for example, DIP electronic elements such as an electrolytic capacitor. In order to make the drawings be simple and concise, FIG. 2 only schematically shows the polar element 110, without depicting other electronic elements.

Generally speaking, a protective film 112 marking the polar direction d1 (mark of polarity) and the characteristics of the polar element 110 is wrapped outside the polar element 110. In the present embodiment, the polar direction d1 of each polar element 110 is different according to the different position of the polar element 110 disposed on the standard substrate 100. In order to conveniently recognize the polar direction d1 of the polar element 110, a common method is to approximately divide the protective film 112 into two colors with different shades for distinguishing. For example, the color of most parts of the protective film 112 is dark green, and a lighter color is used to mark the polar direction d1 of the polar element 110, for example, white.

In the present embodiment, a Complementary Metal-Oxide-Semiconductor (CMOS) camera module or a Charge Coupled Device (CCD) camera module is used to retrieve the image I1 of the standard substrate 100, and a frame is used to select the image of the polar element 110 of the image I1. Meanwhile, the position coordinates and the polar direction d1 of the polar element 110 on the standard substrate 100 in the image I1 are obtained, and then, the position coordinates and the polar direction d1 of the polar element 110 are input into the database of the computer, so as to be recorded as the standard sample for inspecting. The position coordinates of the polar element 110 in the image I1 is record by way of pixel coordinates.

In addition, besides using the camera module to retrieve the image I1 of the standard substrate 100 to obtain the standard sample, the computer may be used to read a data to obtain the standard sample, wherein the data records the geometry coordinates of each polar element 110 on the standard substrate 100, and further records the polar direction d1 of each polar element 110.

Figure 4:
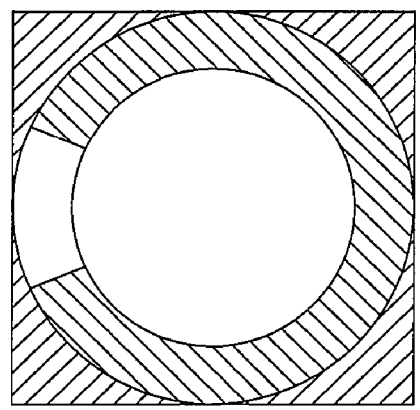
FIG. 4 is a schematic view of using a frame to select a polar element in the image of the standard substrate.

FIG. 4 is a schematic view of using a frame to select a polar element in the image of the standard substrate. Referring to FIG. 4, after obtaining the image I1, the frame is used to select a range for the polar element 110 in the image I1, and to mark the polar direction d2 of the polar element 110, wherein the shape of the frame may be round or rectangle. At this time, the position and size of each frame may be adjusted, such that the center of the polar element 110 is the same as that of the frame.

Moreover, after retrieving the image I1, a relation is calculated by comparing the pixel coordinates of the image I1 with the geometry coordinates of the standard substrate 100, so as to transform the geometry coordinates of the polar element 110 to the pixel coordinates, and thereby recording the pixel coordinates of the polar element 110 in the standard sample in Step S112.

Then, in Step S120, the standard sample that records the pixel coordinates and the polar direction of each polar element 110 on the standard substrate 100 is stored in the database.

Figure 5:
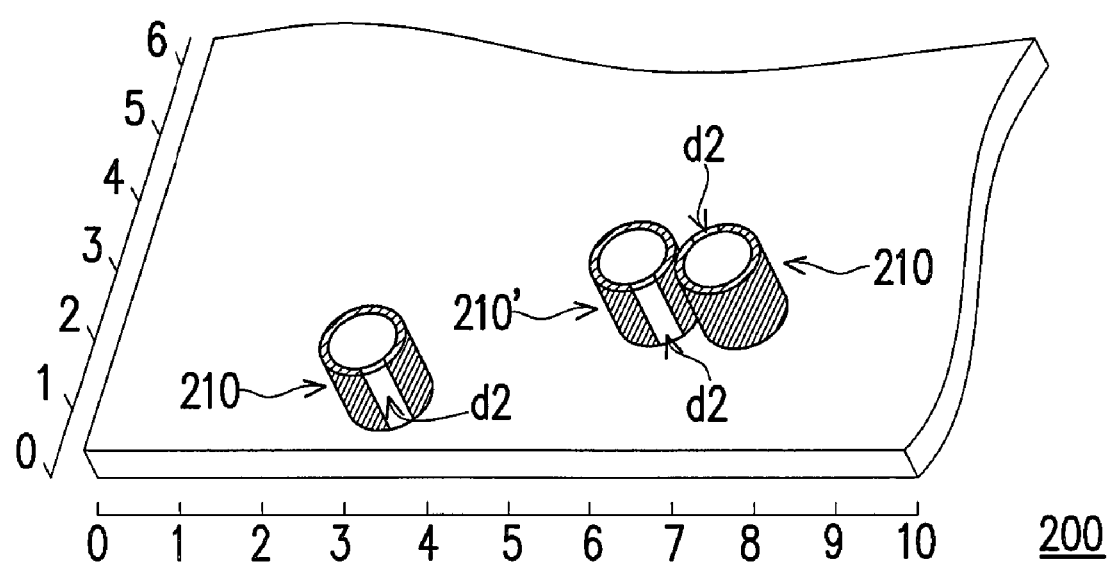
FIG. 5 is a partial schematic view of a substrate to be inspected according to the present embodiment.
Figure 6:
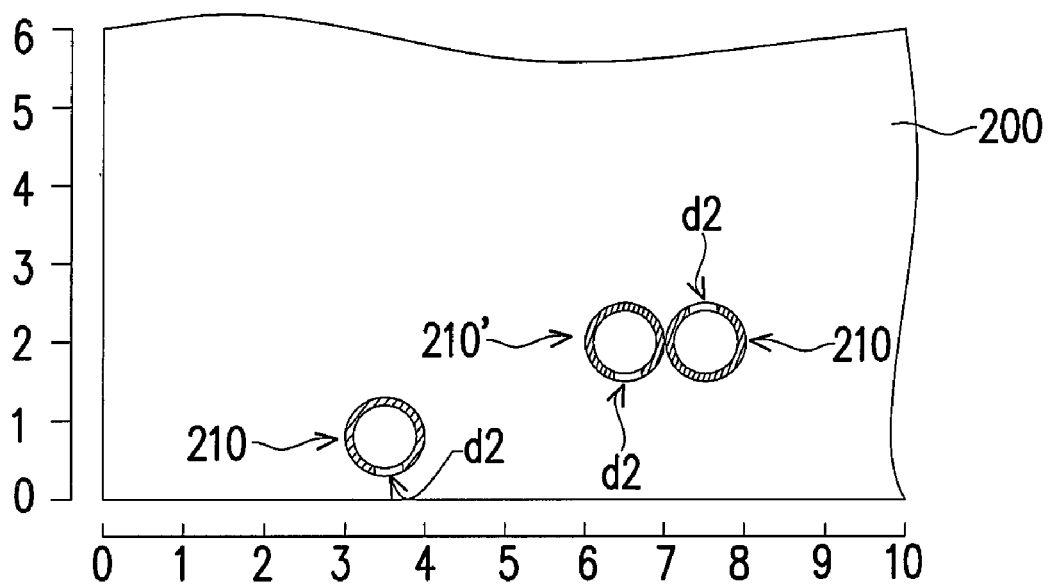
FIG. 6 is a schematic view of an image of the substrate to be inspected of FIG. 5.

FIG. 5 is a partial schematic view of a substrate to be inspected according to the present embodiment, and FIG. 6 is a schematic view of an image of the substrate to be inspected of FIG. 5. Then, in Step S130, a substrate to be inspected 200 is provided, wherein the position for disposing the polar element 210 on the substrate to be inspected 200 is respectively corresponding to that of the polar element 110 on the standard substrate 100.

Then, the camera module is used to retrieve an image I2 of the substrate to be inspected 200 and to obtain the pixel coordinates of the polar element to be inspected 210 on the substrate to be inspected 200.

It should be noted that, when the camera module is used to obtain the image I2 of the substrate to be inspected 200, the angle for retrieving the image of the standard substrate 100 and that of the substrate to be inspected 200 by the camera module must be the same, so as to prevent a great difference between the pixel range of the polar element 110 and that of the polar element 210 in the image I1 and the image I2 caused by different viewing angles, and thereby further preventing the circumstance of affecting the subsequent inspecting operation.

Next, in Step S140, it is inspected whether the polar direction d2 of each polar element to be inspected 210 on the substrate to be inspected 200 is correct or not. Particularly, firstly, the computer is used to read the standard sample stored in the database; then, the position of the polar element 210 in the similar pixel range in the image I2 is searched correspondingly; and then, it is determined whether the polar direction d2 of the polar element 210 is correct or not.

Figure 7:
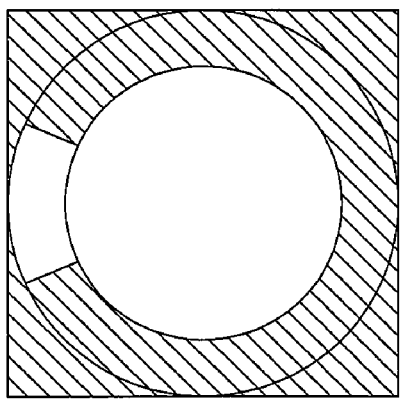
FIG. 7 is a schematic view of the polar element of FIG. 6 after the pixel element has been binary-converted.

FIG. 7 is a schematic view of the polar element of FIG. 6 after the pixel element has been binary-converted. Referring to FIG. 7, in the present embodiment, the method for determining whether the polar direction d2 of the polar element 210 is correct or not includes the following steps. Firstly, in Step S142, the pixel range of the polar element to be inspected 210 in the image I2 is binary-converted by way of image processing.

Particularly, the method of using a program to binary-convert the image includes the following steps. Firstly, a threshold is set in the program. Next, the computer is used to read the grayscale value of each pixel element in the pixel range to be inspected in the image I2 and then to utilize a program to determine whether the grayscale value of the pixel element is larger than the threshold. In the present embodiment, when the grayscale value of the pixel element is larger than the threshold, the color of the pixel element is output as white; on the contrary, when the grayscale value of the pixel element is smaller than the threshold, the color of the pixel element is output as black. In this manner, the binary-converted image I2 only has two colors of black and white, thus, the computer clearly displays the polar direction d2 of each polar element 210.

Then, in Step S144, the polar direction d1 of the polar element 110 is compared with the corresponding polar direction d2 of the polar element 210 in the standard sample and the inspected sample respectively, so as to determine whether the polar directions d2 and d1 of the corresponding polar elements 210 and 110 are the same.

Finally, in Step S146, when the polar direction d2 of the polar element 210' is inspected to be incorrect, the computer is used to mark the position of the polar element 210' with the incorrect polar direction d2 in the image I2. Moreover, the computer also directly displays the pixel coordinates of the polar element 210' with the incorrect polar direction d2. Therefore, the polar element 210' with the reversed polar direction d2 is pulled out from the substrate to be inspected 200 to modify the polar direction d2, and then, it is again inserted on the substrate to be inspected 200. In this manner, the substrate to be inspected 200 is prevented from being exploded or burnt out during the electrical test.

In the present invention, the images of the standard substrate and the substrate to be inspected are retrieved, and then, the standard sample and the inspected sample, which are recording the geometry coordinates and the pixel coordinates of the polar elements on the standard substrate and on the substrate to be inspected, are input into the database for being accessed. Therefore, a plurality of standard samples may be prepared and then input into the database. When another different type of substrate to be inspected is required to be inspected, it only needs to find out the data of the standard sample corresponding to such a substrate, so as to inspect the polar directions of the polar elements in other samples to be inspected. Therefore, the method for automatically inspecting polar directions of the polar element of the present invention also has the advantages of being convenient for changing the data of the standard substrate and suitable for inspecting various kinds of substrates to be inspected.

To sum up, the method for automatically inspecting polar directions of the polar element of the present invention at least has the following advantages.

First, the automatic inspecting method is used to replace the manual visual inspection, so as to reduce the labor cost, to lower the possibility of errors in the polar directions, to enhance the yield of the product and to save the cost for repairing or re-fabricating the substrate.

Second, it only needs to update the standard sample to automatically inspect different samples to be inspected, thus it is convenient for being used and having a wide application scope.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for automatically inspecting polar directions of a polar element, which is used for inspecting a substrate to be inspected having a plurality of polar elements to be inspected, comprising:

obtaining a standard sample, which is recording position coordinates and polar directions of the plurality of polar elements;

retrieving an inspected image of the substrate to be inspected;

determining whether grayscale values of the inspected image to be inspected are larger than a threshold or not and binary-converting the colors of the polar elements in the inspected image to obtain the polar directions;

recording a inspected sample according to the inspected image, wherein position coordinates and polar directions of each of the polar elements to be inspected are included; and comparing the standard sample with the inspected sample.

2. The method for automatically inspecting polar directions of a polar element as claimed in claim 1, wherein the standard sample is obtained from a data including geometry coordinates of the plurality of polar elements disposed on a standard substrate.

3. The method for automatically inspecting polar directions of a polar element as claimed in claim 2, further comprising a step of transforming each pair of geometry coordinates into pixel coordinates.

4. The method for automatically inspecting polar directions of a polar element as claimed in claim 1, further comprising a step of calibrating the substrate to be inspected.

5. The method for automatically inspecting polar directions of a polar element as claimed in claim 1, further comprising a step of retrieving a standard image of a standard substrate to obtain the standard sample.

6. The method for automatically inspecting polar directions of a polar element as claimed in claim 1, further comprising a step of using the computer to automatically select a pixel range for the polar elements to be inspected in the inspected image before determining whether a grayscale values of the inspected image to be inspected are larger than the threshold or not.

7. The method for automatically inspecting polar directions of a polar element as claimed in claim 1, wherein the step of determining whether grayscale values of the inspected image to be inspected are larger than a threshold or not and binary-converting the colors of the polar elements to be inspected to obtain the polar directions comprises:

determining whether grayscale values of a plurality of pixel elements within the range to be inspected are larger than the threshold or not; and outputting the color of the pixel element with a grayscale value being larger than the threshold as white, and outputting the color of the pixel element with a grayscale value being smaller than the threshold as black.

8. The method for automatically inspecting polar directions of a polar element as claimed in claim 1, further comprising a step of marking the polar element to be inspected in the inspected image, if the inspected sample is not inconsistent with the standard sample.

9. The method for automatically inspecting polar directions of a polar element as claimed in claim 1, further comprising a step of displaying the pixel coordinates of the polar element to be inspected, if the inspected sample is not inconsistent with the standard sample.

* * * * *